United States Patent
Schotman et al.

(10) Patent No.: US 6,795,036 B2
(45) Date of Patent: Sep. 21, 2004

(54) MAST FOR A SOURCE OF ELECTROMAGNETIC WAVES, PROVIDED WITH A STABILIZATION DEVICE

(75) Inventors: Willem Yvo Schotman, The Hague (NL); Peter Veldt, Hoogland (NL)

(73) Assignee: Koninklijke KPN N.V., Groningen (NL)

( * ) Notice: Subject to any disclaimer, the term of this patent is extended or adjusted under 35 U.S.C. 154(b) by 11 days.

(21) Appl. No.: 10/181,302
(22) PCT Filed: Dec. 29, 2000
(86) PCT No.: PCT/EP00/13379
§ 371 (c)(1),
(2), (4) Date: Sep. 11, 2002
(87) PCT Pub. No.: WO01/53633
PCT Pub. Date: Jul. 26, 2001

(65) Prior Publication Data
US 2003/0048233 A1 Mar. 13, 2003

(30) Foreign Application Priority Data
Jan. 17, 2000 (NL) ............................................. 1014085

(51) Int. Cl.[7] .................................................. H01Q 1/12
(52) U.S. Cl. .................... 343/890; 343/874; 248/219.4; 52/40
(58) Field of Search ................................ 343/874, 878, 343/882, 890, 891; 248/219.4, 230.1; 52/40, 649

(56) References Cited

U.S. PATENT DOCUMENTS

| 2,510,059 | A | | 6/1950 | Black |
| 4,126,864 | A | * | 11/1978 | Hopkins ...................... 343/704 |
| 5,954,305 | A | * | 9/1999 | Calabro .................... 248/219.4 |
| 6,098,758 | A | * | 8/2000 | Gates .......................... 187/250 |
| 6,111,553 | A | * | 8/2000 | Steenbuck ................... 343/891 |
| 6,115,004 | A | * | 9/2000 | McGinnis .................... 343/890 |
| 6,131,349 | A | * | 10/2000 | Hill .............................. 52/292 |

FOREIGN PATENT DOCUMENTS

| DE | 32 14 181 C1 | 11/1983 |
| DE | 40 09 893 A1 | 10/1991 |
| GB | 2 040 429 A | 8/1980 |

\* cited by examiner

*Primary Examiner*—Tho Phan
(74) *Attorney, Agent, or Firm*—Frishauf, Holtz, Goodman & Chick, P.C.

(57) ABSTRACT

Mast for a source of electromagnetic waves, comprising a number of peripheral rods (1) extending in vertical direction, the peripheral rods being mutually connected by transverse rods (2), and forming a space for accommodating the electromagnetic wave source in, or at the top of, the mast. The mast is provided with a stabilization device for reducing uncontrollable natural vibrations in the event of hypercritical wind speeds, said device being accommodated in, or on top of, the mast. The mast advantageously supports a lining of dishes (7).

16 Claims, 2 Drawing Sheets

MAST FOR A SOURCE OF ELECTROMAGNETIC WAVES, PROVIDED WITH A STABILIZATION DEVICE

This application is a U.S. National Phase Application under 35 USC 371 of International Application PCT/EP00/13379 filed Dec. 29, 2000.

BACKGROUND OF THE INVENTION

1. Field of the Invention

The invention relates to a mast for a source of electromagnetic waves, comprising a number of peripheral rods extending in a vertical direction, the peripheral rods being mutually connected by transverse rods and forming a space for accommodating the electromagnetic wave source in, or on top of, the mast.

2. Description of the Related Art

Such masts are known, and are used in telecommunication, particularly as radio masts for the benefit of mobile telecommunication. Such masts serve as a support for antenna configurations, and offer protection to sources of electromagnetic waves mounted in the top of the mast, such as antennae, microwave beam transmitters and the like.

Such masts furthermore offer a beautiful architectonic design which, if so desired, may be very well fit into the urban design.

Such masts have the drawback, however, that on account of their shape, they are sensitive to uncontrollable natural vibrations in the event of hypercritical wind speeds. Said phenomenon occurs in the event of wind speeds from 30 to 40 km/h., is known as "galloping", and has a strongly negative effect on the functionality and the structural integrity of the mast. It is noted that the effect of galloping differs from the one of ordinary vibrations as a result of the wind, which is understood by experts.

In the event of structural galloping, small movements of the structure perpendicularly to the direction of the wind are amplified by the forces of the wind on the structure.

The phenomenon may particularly occur in the event of flexible structures having a triangular cross section. With such structures, a small deviation from the equilibrium position is amplified by a negative lifting force perpendicular to the direction of the wind.

The energy added by the wind manifests itself in an uncontrollable increase of the deviation.

In practice, galloping manifests itself with radio masts having certain antenna configurations and with radio masts having a triangular cross section bearing a lining.

BRIEF SUMMARY OF THE INVENTION

The invention now overcomes said objections, and the mast according to the invention is characterised for that purpose by the mast being provided with a stabilisation device for reducing uncontrollable natural vibrations in the event of hypercritical wind speeds, said stabilisation device being accommodated in, or on top of, the mast.

In this manner, the natural vibrations in question are reduced to an acceptable level, and the energy added by the wind is adsorbed before this results in uncontrollable travels of the mast.

BRIEF DESCRIPTION OF THE DRAWINGS

Below, the invention will now be explained in further detail on the basis of the drawings and the description.

DETAILED DESCRIPTION OF THE PREFERRED EMBODIMENT

Figure 1:
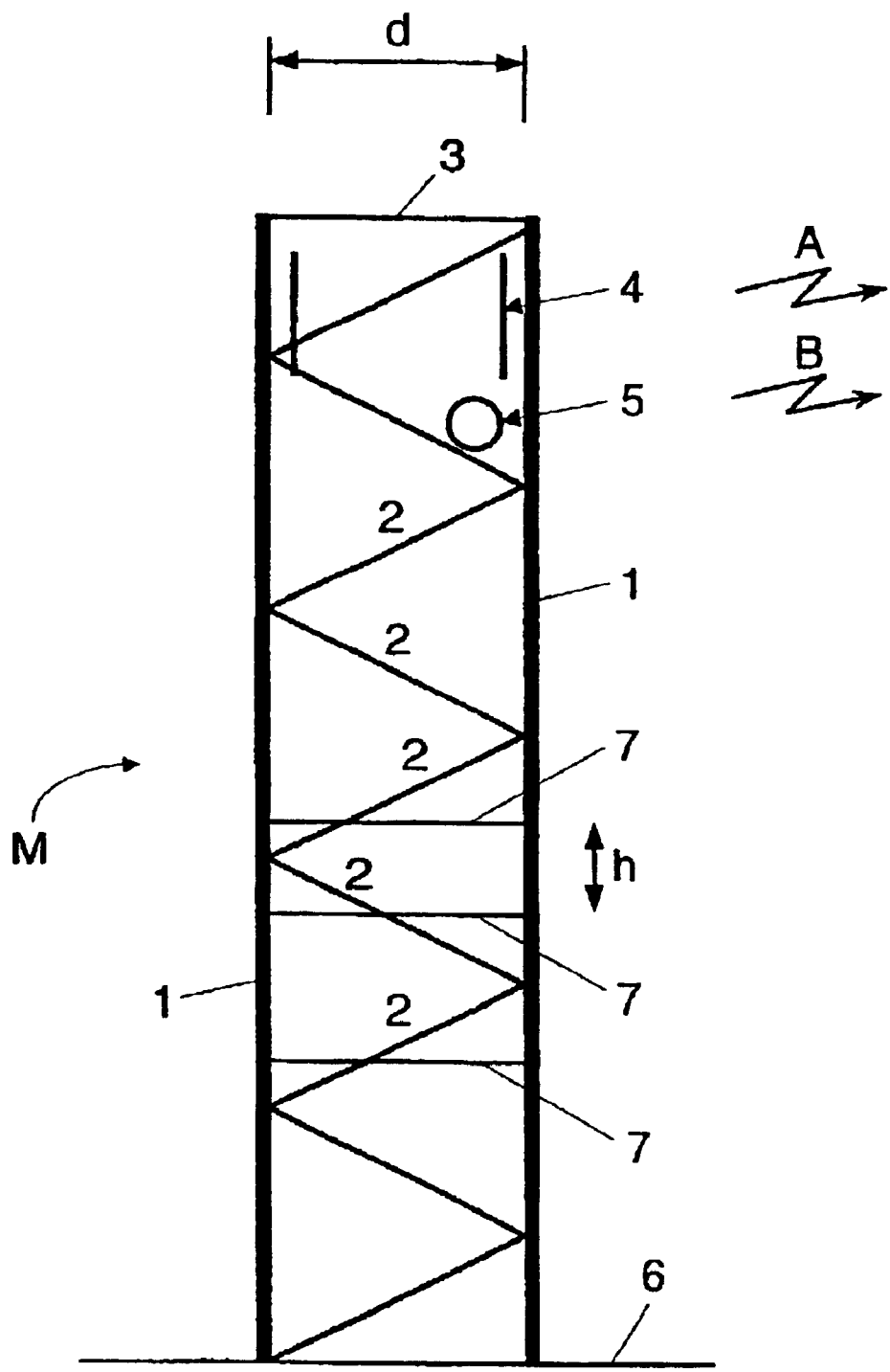
FIG. 1 schematically shows a view of a dish mast.

In the figures, the same reference numerals denote the same parts.

Referring now to FIG. 1, a general view is given of an advantageous embodiment of a so-called dish mast, which is provided with a lining of dishes.

FIG. 1 shows a dish mast comprising a number of peripheral rods 1 extending in vertical direction, which are mutually connected by transverse rods 2 and connection rods 3 running in zigzag, and which form a space for accommodating the electromagnetic wave source.

The source of electromagnetic waves, e.g., an antenna 4 or a microwave beam transmitter 5, for clearness' sake is shown only schematically, and is located in, or on top of, the dish mast.

The antenna sets up a connection with GSM equipment (schematically shown by the arrow A), while the microwave beam transmitter sets up a connection with other antenna locations (schematically shown by the arrow B). There is always an antenna present in, or on top of, the mast, while the presence of a microwave beam transmitter may be optional.

As is known to experts, the dish mast is connected to earth 6 in any way suitable to that end.

The peripheral rods 1, in any way suitable to that end which is known to experts, bear an enveloping adjoining lining of a number of preferably slightly curved preferably closed dishes 7 extending in vertical direction, advantageously consisting of polycarbonate dishes. The dishes, however, may also have such a shape that the result is a circular or differently-shaped cross section of the dish mast.

In practice, the height of the dish mast is 32 to 50 meters, the diameter d thereof 1.5 to 2 meters, and the height h of a dish is 2.0 meters.

Figure 2:
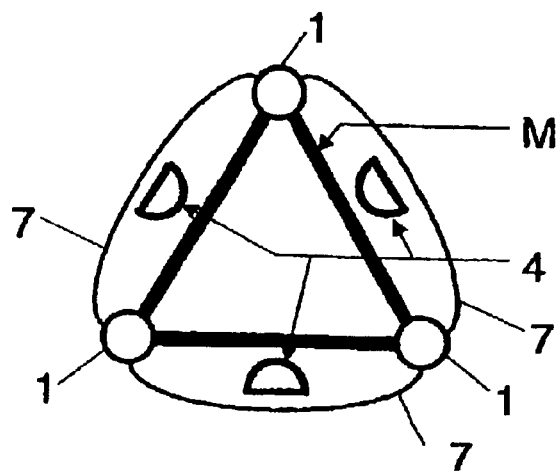
FIG. 2 shows a top view of FIG. 1.

Advantageously, the cross section of the mast is triangular, as is shown in FIG. 2. On each side of the triangular cross section of the mast, in any way suitable to that end, antenna configurations 4 are mounted (for clearness' sake only shown schematically). The mast M therefore functions as a support for the lining 7, the antenna configurations 4, and the microwave beam transmitters 5. (The latter are not shown in FIG. 2).

Figure 3:
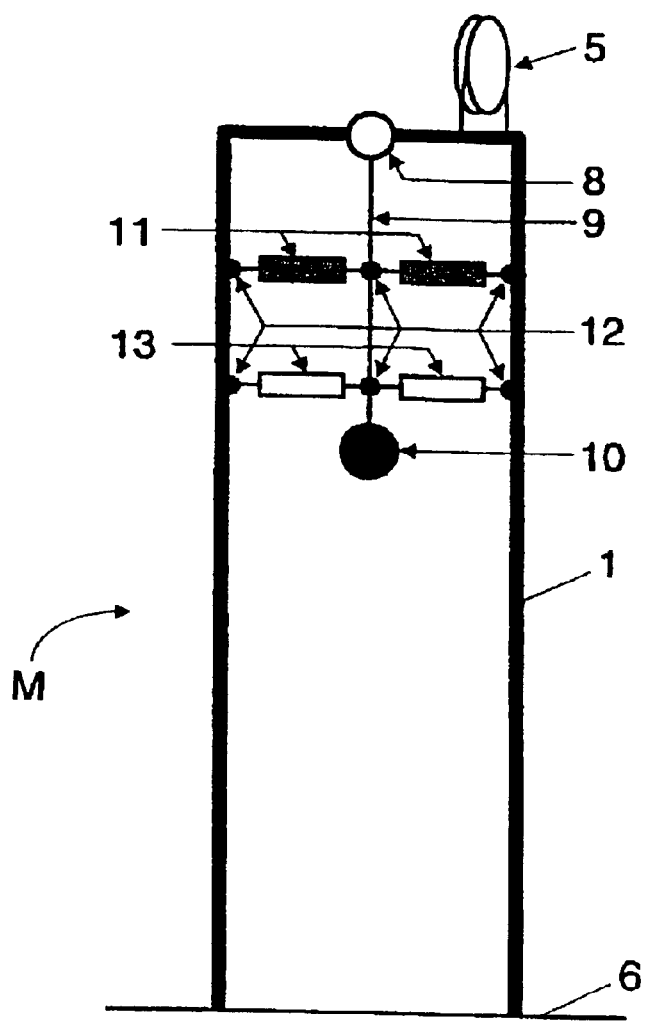
FIG. 3 shows a longitudinal cross section of an advantageous embodiment of the invention.

In FIG. 3, for clearness' sake the mast M is only shown schematically.

In addition, in FIG. 3 a microwave beam transmitter 5 is shown on the mast M. In any way suitable to that end, which is known per se to experts and will therefore not be set forth in further detail, according to the invention a stabilisation device is now mounted to prevent galloping in the top of the mast M, such as, e.g., an attenuated mass/spring system, in this case a pendulum suspended in the mast. The attenuation is realised by coupling the mass 10, by way of dampers, to the structure.

In FIG. 3, a cardan suspension 8 is mounted to the mast, which suspension permits rotations of a suspension rod 9 exclusively along the two horizontal axes. The flexurally stiff suspension rod 9 connects the mass 10 to the cardan suspension 8. Two or more springs 11 connect the suspension rod 9 to the mast M by way of flexible couplings 12. The flexible couplings 12 are located between the springs 11 and the mast M, or the suspension rod 9, as well as between the dampers 13 and the mast M or the suspension rod 9. Two or more adjustable dampers 13 connect the suspension rod 9 to the mast M. The mass 10 is fixedly connected to the suspension rod 9.

The natural frequency f1 of the mass/spring system differs from the natural frequency f2 of the mast M to such an extent that the ratio f1/f2 is substantially equal to (1+m2/m1), where m1 is the mass 10 and m2 is the schematised mass of the mast M.

The dampers 13 are adjustable in such a manner that, under the prevailing wind conditions, a maximum damping occurs of the movements of the mast M.

The operation of a mass/spring system as such is known per se to experts and will therefore not be explained in detail here.

The mass of the system is small as compared to de mass of the mast.

The oscillation period and the damping measure are advantageously tuned to the natural vibrations of the mast, on the one hand, to achieve a maximum reduction of the uncontrollable natural vibrations in the event of hypercritical wind speeds and, on the other hand, to limit the mass as far as possible.

According to the invention, reductions having a factor 5 to 10 are advantageously feasible.

In another advantageous embodiment of the invention, the mass/spring system comprises a mass, spring-mounted on the mast. In this connection, a mass/spring system is mounted on top of the mast, and comprises a mass which is permitted to move horizontally, a spring to keep the mass in place, and a damper to absorb energy.

In a still further advantageous embodiment of the invention, the damper may comprise the application, e.g., of a fluid damper, particularly a viscous damper, or a spring system making use of rheological material having a high internal damping.

Such materials are known to experts, and will therefore not be discussed here.

In yet another advantageous embodiment of the invention, a U-shaped reservoir may be mounted on, or to the top of, the mast, which reservoir is filled with a fluid serving as a mass, and of which both legs of the U are in connection with one another by way of a reducing valve serving as a damper. The level difference possibly occurring in the legs of the U ("sloshing height") may serve as a spring.

Various modifications of the dish mast according to the invention will be understood by experts after the above description and drawings, and will therefore not need to be explained in further detail.

Such modifications are deemed to fall within the framework and the protection scope of the present invention.

What is claimed is:

1. A mast for a source of electromagnetic waves, the mast reducing the effect of galloping so as to maintain the functionality and structural integrity of the mast, the mast comprising a plurality of peripheral rods extending in a vertical direction, the peripheral rods being mutually connected by transverse rods, and defining a space for accommodating an electromagnetic wave source in, or at the top of, the mast, wherein the peripheral rods support an enveloping, adjoining lining of dishes extending in a vertical direction and the mast is provided with a stabilisation device for reducing the effect of galloping and of uncontrollable natural vibrations in the event of hypercritical wind speeds, said stabilisation device being accommodated in, or at the top of, the mast.

2. The mast according to claim 1, wherein the mast has a triangular cross section.

3. The mast according to claim 1, wherein the stabilisation device is a damped mass/spring system.

4. The mast according to claim 3, wherein the mass/spring system comprises a pendulum suspended in the mast, and springs disposed between the pendulum and the mast.

5. The mast according to claim 4, further comprising adjustable dampers disposed between the pendulum and the mast.

6. The mast according to claim 4, further comprising flexible couplings disposed between the springs and the mast or pendulum, as well as between the dampers and the mast or pendulum.

7. The mast according to claim 3, wherein the mass/spring system comprises a mass, spring-mounted onto the mast.

8. The mast according to claim 3, wherein damping takes place by way of a liquid damper.

9. The mast according to claim 8, wherein the liquid damper is a viscous liquid damper.

10. The mast according to claim 3, wherein the spring system makes use of rheological materials having a great internal attenuation.

11. The mast according to claim 1, wherein the source of electromagnetic waves is an antenna.

12. The mast according to claim 1, wherein on, or in the top of, the mast a U-shaped reservoir is mounted, which is filled with a fluid serving as a mass, and of which both legs of the U-shaped reservoir are connected with one another by way of a reducing valve serving as a damper.

13. The mast according to claim 1, wherein the lining consists of polycarbonate dishes.

14. The mast according to claim 13, wherein an antenna is mounted on each side of the triangular cross section.

15. The mast according to claim 1, wherein the dishes present closed surfaces to the wind.

16. The mast according to claim 1, wherein the reduction factor of the stabilisation device for reducing the natural vibrations is 5 to 10.

* * * * *